United States Patent
Chen et al.

(10) Patent No.: US 11,503,469 B2
(45) Date of Patent: Nov. 15, 2022

(54) USER AUTHENTICATION METHOD AND APPARATUS

(71) Applicant: Huawei Technologies Co., Ltd., Shenzhen (CN)

(72) Inventors: Jing Chen, Shanghai (CN); Kai Pan, Shanghai (CN); He Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/588,599

(22) Filed: Sep. 30, 2019

(65) Prior Publication Data

US 2020/0029217 A1 Jan. 23, 2020

Related U.S. Application Data

(63) Continuation of application No. PCT/CN2017/079234, filed on Apr. 1, 2017.

(51) Int. Cl.
*H04W 12/06* (2021.01)
*H04W 76/11* (2018.01)
(Continued)

(52) U.S. Cl.
CPC ....... *H04W 12/068* (2021.01); *H04L 63/0892* (2013.01); *H04L 67/141* (2013.01);
(Continued)

(58) Field of Classification Search
CPC . H04W 12/068; H04W 76/11; H04W 12/084; H04W 12/069; H04W 8/18; H04W 12/06; H04L 63/0892; H04L 67/141
(Continued)

(56) References Cited

U.S. PATENT DOCUMENTS

| 10,779,345 B2* | 9/2020 | Faccin | H04W 76/20 |
| 2003/0126441 A1* | 7/2003 | Laux | H04L 63/083 |
| | | | 713/168 |

(Continued)

FOREIGN PATENT DOCUMENTS

| CN | 106302343 A | 1/2017 |
| CN | 106302353 A | 1/2017 |

OTHER PUBLICATIONS

Nokia et al., "EAP based Secondary authentication with an external DN-AAA server," 3GPP TSG SA WG3 (Security) Meeting #86Bis, S3-170745, Busan, Korea, Mar. 27-31, 2017, 4 pages.

(Continued)

*Primary Examiner* — Charles N Appiah
*Assistant Examiner* — Frank E Donado
(74) *Attorney, Agent, or Firm* — Slater Matsil, LLP

(57) ABSTRACT

This application provides a user authentication method and an apparatus. Before establishing, for a terminal device, a session used to transmit service data, an SMF entity receives a session establishment request message; determines, based on the session establishment request message, to perform user authentication on a user using the terminal device; and sends a session establishment message to a UPF entity, where the session establishment message is used to establish a first session for the terminal device, and a session attribute of the first session is: a session used to transmit only a user authentication message. Subsequently, the terminal device and an AAA server transmit the user authentication message through the first session, to complete user authentication.

14 Claims, 6 Drawing Sheets

(51) Int. Cl.
  *H04L 67/141*  (2022.01)
  *H04W 8/18*   (2009.01)
  *H04W 12/069* (2021.01)
  *H04W 12/084* (2021.01)
  *H04L 9/40*   (2022.01)

(52) U.S. Cl.
  CPC ........... *H04W 8/18* (2013.01); *H04W 12/069* (2021.01); *H04W 12/084* (2021.01); *H04W 76/11* (2018.02)

(58) Field of Classification Search
  USPC ........................................................ 455/411
  See application file for complete search history.

(56) References Cited

U.S. PATENT DOCUMENTS

| | | |
|---|---|---|
| 2009/0135806 A1 | 5/2009 | Pulhug |
| 2011/0216743 A1* | 9/2011 | Bachmann ............ H04L 63/164 370/331 |
| 2013/0268687 A1* | 10/2013 | Schrecker ............. H04W 12/06 709/229 |
| 2013/0273876 A1* | 10/2013 | Rasanen ........... H04M 3/42153 455/404.1 |
| 2016/0191663 A1* | 6/2016 | Qiu ..................... H04L 65/1016 709/207 |
| 2016/0262020 A1* | 9/2016 | Zalzalah ............... H04W 48/04 |
| 2017/0048710 A1* | 2/2017 | Agarwal ............. H04W 12/062 |
| 2017/0289046 A1* | 10/2017 | Faccin ................. H04L 47/2433 |
| 2018/0270888 A1* | 9/2018 | Faccin .................. H04W 76/15 |
| 2018/0317086 A1* | 11/2018 | Ben Henda ....... H04W 12/0431 |

OTHER PUBLICATIONS

Qualcomm Inc., "pCR: Solution for UE-UPF security setup," 3GPP TSG SA WG3 (Security) Meeting #86Bis, Mar. 27, 2017, 6 pages.

* cited by examiner

USER AUTHENTICATION METHOD AND APPARATUS

CROSS-REFERENCE TO RELATED APPLICATIONS

This application is a continuation of International Patent Application No. PCT/CN2017/079234, filed on Apr. 1, 2017, the disclosure of which is hereby incorporated by reference in its entirety.

TECHNICAL FIELD

This application relates to communications technologies, and in particular, to a user authentication method and an apparatus.

BACKGROUND

As a basis of mobile communications, authentication can ensure that an authorized user accesses a network and uses a network resource. The authorized user herein means an authorized universal subscriber identity module (USIM) card. In a current technology, performing authentication on an authorized user is performing authentication on subscription information (of a SIM card or a USIM card). For example, it is considered that one time of communication includes three key factors: a valid SIM card or USIM card, a terminal device (for example, a mobile phone) operating normally, and a user. Therefore, to ensure communication security, authentication not only needs to be performed on subscription information of the SIM card or USIM card, but also needs to be performed on the terminal device and the user.

In a current technology, authentication on the terminal device and the user exists. Authentication on a terminal is implemented by using a blacklist and a whitelist in an equipment identity register (EIR), and authentication on the user usually exists in only some third-party applications having a relatively high requirement for security, for example, financial services such as mobile banking. These services perform user authentication through respective applications, and the applications are independent of each other. Usually, an operator performs authentication on only the subscription information of the SIM card or USIM card, and does not perform authentication on the user. As a result, there is a risk that the terminal device is falsely used by an unauthorized user.

SUMMARY

This application provides a user authentication method and an apparatus, to perform user authentication before a session is established for a terminal device, and prevent an unauthorized user from performing communication by using the terminal device, thereby strengthening security management of an operator on communication that is performed by a user by using the terminal device.

A first aspect of this application provides a user authentication method, including: receiving, by a session management function entity, a session establishment request message, where the session establishment request message is used to request to establish a session for a terminal device; determining, based on the session establishment request message, to perform user authentication on a user using the terminal device; sending a session establishment message to a user plane function entity, where the session establishment message is used to establish a first session for the terminal device, and a session attribute of the first session is: a session used to transmit only a user authentication message; and sending an indication message to the terminal device, where the indication message is used to indicate the session attribute of the first session.

Before establishing, for the terminal device, a session used to transmit service data, the SMF entity establishes, for the terminal device, the first session used to transmit only the user authentication message, and subsequently the terminal device and an AAA server transmit the user authentication message through the first session, to complete user authentication. This prevents an unauthorized user from performing communication by using the terminal device, thereby strengthening security management of an operator on communication that is performed by a user by using the terminal device.

Optionally, the method further includes: obtaining, by the session management function entity, a result of the user authentication; and when the result of the user authentication indicates that the user authentication succeeds, deleting, by the session management function entity, the first session, and establishing a second session for the terminal device, where a session attribute of the second session is: a session used to transmit service data.

Optionally, the method further includes: obtaining, by the session management function entity, a result of the user authentication; and when the result of the user authentication indicates that the user authentication succeeds, changing, by the session management function entity, the session attribute of the first session into: a session used to transmit service data.

Optionally, the obtaining, by the session management function entity, a result of the user authentication is specifically: receiving, by the session management function entity, the result of the user authentication sent by an authentication, authorization and accounting AAA server; or receiving, by the session management function entity, the result of the user authentication sent by the terminal device.

When the session management function entity receives the result of the user authentication from the terminal device, the method further includes: verifying, by the session management function entity, that the result of the user authentication is valid.

A second aspect of this application provides a session management function entity, including: a receiving module, configured to receive a session establishment request message, where the session establishment request message is used to request to establish a session for a terminal device; a processing module, configured to determine, based on the session establishment request message, to perform user authentication on a user using the terminal device; and a sending module, configured to send a session establishment message to a user plane function entity, where the session establishment message is used to establish a first session for the terminal device, and a session attribute of the first session is: a session used to transmit only a user authentication message, where the sending module is further configured to send an indication message to the terminal device, where the indication message is used to indicate the session attribute of the first session.

Optionally, the receiving module is further configured to obtain a result of the user authentication; and correspondingly, the processing module is further configured to: when the result of the user authentication indicates that the user authentication succeeds, delete the first session, and establish a second session for the terminal device, where a session attribute of the second session is: a session used to transmit service data.

Optionally, the receiving module is further configured to obtain a result of the user authentication; and the processing module is further configured to: when the result of the user authentication indicates that the user authentication succeeds, change the session attribute of the first session into: a session used to transmit service data.

Optionally, the receiving module is specifically configured to: receive the result of the user authentication sent by an authentication, authorization and accounting AAA server; or receive the result of the user authentication sent by the terminal device; and when the result of the user authentication is sent by the terminal device, the processing module is further configured to: verify that the result of the user authentication is valid.

A third aspect of this application provides a session management function entity, including: a receiver, configured to receive a session establishment request message, where the session establishment request message is used to request to establish a session for a terminal device; a processor, configured to determine, based on the session establishment request message, to perform user authentication on a user using the terminal device; and a transmitter, configured to send a session establishment message to a user plane function entity, where the session establishment message is used to establish a first session for the terminal device, and a session attribute of the first session is: a session used to transmit only a user authentication message, where the transmitter is further configured to send an indication message to the terminal device, where the indication message is used to indicate the session attribute of the first session.

Optionally, the receiver is further configured to obtain a result of the user authentication. Correspondingly, the processor is further configured to: when the result of the user authentication indicates that the user authentication succeeds, delete the first session, and establish a second session for the terminal device, where a session attribute of the second session is: a session used to transmit service data.

Optionally, the receiver is further configured to obtain a result of the user authentication. Correspondingly, the processor is further configured to: when the result of the user authentication indicates that the user authentication succeeds, change the session attribute of the first session into: a session used to transmit service data.

Optionally, the receiver is specifically configured to: receive the result of the user authentication sent by an authentication, authorization and accounting AAA server; or receive the result of the user authentication sent by the terminal device.

When the result of the user authentication is sent by the terminal device, the processor is further configured to: verify that the result of the user authentication is valid.

In the first aspect to the third aspect of this application, optionally, the session establishment request message includes at least one of the following information: a user authentication request identifier, service information, subscription information, operator authentication indication information, and third-party authentication indication information.

In the first aspect to the third aspect of this application, optionally, the session establishment message includes a session attribute identifier of the first session, and the session attribute identifier is used to indicate that the session attribute of the first session is: a session used to transmit only a user authentication message.

The session management function entity provided in the second aspect and the third aspect of this application may be configured to perform the method provided in the first aspect of this application, and implementations and beneficial effects of the session management function entity are similar to those of the method. Details are not described herein again.

A fourth aspect of this application provides a user authentication method, including: receiving, by a terminal device, an indication message from a session management function entity, where the indication message is used to indicate that a session attribute of a first session is: a session used to transmit only a user authentication message; and sending or receiving, by the terminal device, the user authentication message through the first session.

A fifth aspect of this application provides a terminal device, including: a receiving module, configured to receive an indication message from a session management function entity, where the indication message is used to indicate that a session attribute of a first session is: a session used to transmit only a user authentication message; and a sending module, configured to send the user authentication message through the first session, where the receiving module is further configured to receive the user authentication message through the first session.

A sixth aspect of this application provides a terminal device, including: a receiver, configured to receive an indication message from a session management function entity, where the indication message is used to indicate that a session attribute of a first session is: a session used to transmit only a user authentication message; and a transmitter, configured to send the user authentication message through the first session, where the receiver is further configured to receive the user authentication message through the first session.

In the fourth aspect to the sixth aspect of this application, optionally, the user authentication message is included in a data packet, the data packet includes a message type identifier, and the message type identifier is used to indicate that the data packet includes the user authentication message.

A seventh aspect of this application provides a user authentication method, including: receiving, by a user plane function entity, a session establishment message from a session management function entity, where the session establishment message is used to establish a first session for a terminal device, and a session attribute of the first session is: a session used to transmit only a user authentication message; and sending or receiving, by the user plane function entity, the user authentication message of the terminal device through the first session.

Optionally, the user authentication message is included in a data packet, the data packet includes a message type identifier, and the message type identifier is used to indicate that the data packet includes the user authentication message.

Correspondingly, the sending, by the user plane function entity, the user authentication message of the terminal device through the first session is specifically: receiving, by the user plane function entity, the data packet of the terminal device from an authentication, authorization and accounting AAA server; and if the data packet includes the user authentication message of the terminal device, sending, by the user plane function entity through the first session, the user authentication message included in the data packet.

An eighth aspect of this application provides a user plane function entity, including: a receiving module, configured to receive a session establishment message from a session management function entity, where the session establishment message is used to establish a first session for a terminal device, and a session attribute of the first session is: a session used to transmit only a user authentication message; and a sending module, configured to send the user authentication message of the terminal device through the first session, where the receiving module is further configured to receive the user authentication message of the terminal device through the first session.

Optionally, the user authentication message is included in a data packet, the data packet includes a message type identifier, and the message type identifier is used to indicate that the data packet includes the user authentication message.

Correspondingly, the receiving module is specifically configured to: receive the data packet of the terminal device from an authentication, authorization and accounting AAA server; and the sending module is specifically configured to, if the data packet includes the user authentication message of the terminal device, send, by the user plane function entity through the first session, the user authentication message included in the data packet.

A ninth aspect of this application provides a user plane function entity, including: a receiver, configured to receive a session establishment message from a session management function entity, where the session establishment message is used to establish a first session for a terminal device, and a session attribute of the first session is: a session used to transmit only a user authentication message; and a transmitter, configured to send the user authentication message of the terminal device through the first session, where the receiver is further configured to receive the user authentication message of the terminal device through the first session.

Optionally, the user authentication message is included in a data packet, the data packet includes a message type identifier, and the message type identifier is used to indicate that the data packet includes the user authentication message.

Correspondingly, the receiver is specifically configured to: receive the data packet of the terminal device from an authentication, authorization and accounting AAA server; and the transmitter is specifically configured to, if the data packet includes the user authentication message of the terminal device, send, by the user plane function entity through the first session, the user authentication message included in the data packet.

The solutions provided in this application are compared with the current technology, and in the solutions, before establishing, for the terminal device, the session used to transmit the service data, the SMF entity establishes, for the terminal device, the first session used to transmit only the user authentication message, and subsequently the terminal device and the AAA server transmit the user authentication message through the first session, to complete user authentication. This prevents an unauthorized user from performing communication by using the terminal device, thereby strengthening security management of an operator on communication that is performed by a user by using the terminal device.

DETAILED DESCRIPTION OF ILLUSTRATIVE EMBODIMENTS

This application provides a user authentication method that may be applied to a plurality of communications systems, and the communications system may be a global system for mobile communications (GSM) system, a code division multiple access (CDMA) system, a wideband code division multiple access (WCDMA) system, a long term evolution (LTE) system, or a 5th-generation mobile communications (5G) system.

Figure 1:
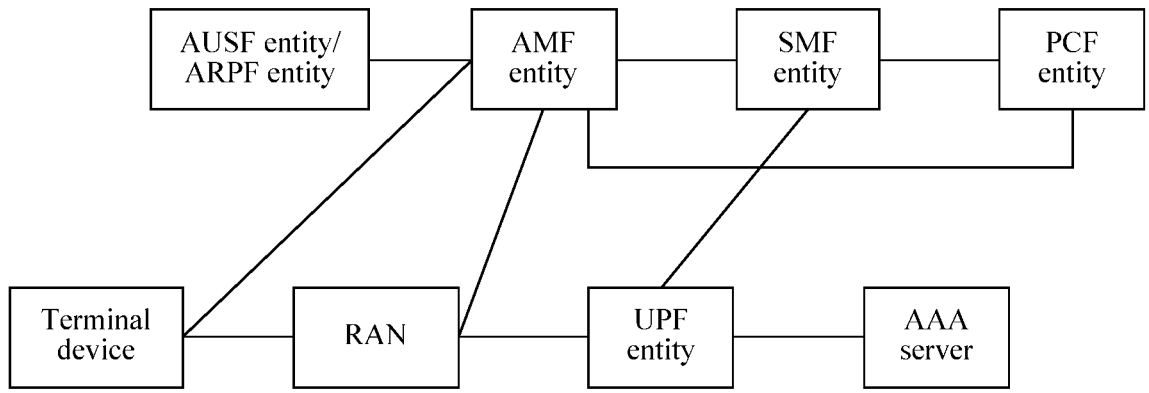
FIG. 1 is a schematic architectural diagram of an application scenario according to this application.

FIG. 1 is a schematic architectural diagram of an application scenario according to this application. As shown in FIG. 1, a 5G system may include: a terminal device, a (radio) access network ((R)AN), an access and mobility management function (AMF) entity, a session management function (SMF) entity, a user plane function (UPF) entity, an authentication server function (AUSF) entity/authentication credential repository and processing function (ARPF) entity, a policy control function (PCF) entity, and an authentication, authorization and accounting (AAA) server.

The (R)AN is responsible for access of the terminal device. The AMF entity is mainly responsible for services such as mobility management and access management that are equivalent to functions of a mobility management entity (MME) in an LTE system other than a session management function. The SMF entity is mainly responsible for establishing a session, changing a session, or releasing a session. The UPF entity is equivalent to a packet data network gateway (P-GW) in the LTE system, and is mainly responsible for functions such as session and bearer management and internet protocol (IP) address assignment. The PCF entity is mainly responsible for providing a policy to a network. The AAA server is mainly responsible for performing authentication on a SIM card, authorizing services that the SIM card can use, and recording a network resource used by the SIM card. The AAA server may be provided by an operator or may be provided by a third-party service provider. The AUSF entity is a termination point of an authentication request message and interacts with the ARPF entity to obtain a long-term security credential of UE. The ARPF entity is mainly responsible for storing the long-term security credential of the UE.

When the method of this application is applied to the LTE system, the AMF entity and the SMF entity may be replaced with the MME, the UPF entity may be replaced with the P-GW and a serving gateway entity (S-GW) in the LTE system, the AUSF entity and the ARPF entity are replaced with a home subscriber server (HSS), and the HSS is configured to store subscription information, where the subscription information may be subscription information of the SIM card or a USIM card. The MME is a signaling management network element, and is responsible for functions such as signaling encryption of a non-access stratum ("NAS"), allocation of a temporary identity to the UE, selection of core-network network elements such as the SGW and the PGW, roaming, tracking, and ensuring security. The SGW is a mobility anchor for handover between evolved NodeBs (eNB), and provides lawful interception related functions. The PGW is responsible for related functions such as IP address assignment, solution control, charging rule enforcement, and lawful interception.

A terminal device mentioned in this application may be a wireless terminal. The wireless terminal may refer to a device that provides a user with voice and/or data connectivity, a handheld device with a radio connection function, or another processing device connected to a radio modem. The wireless terminal may communicate with at least one core network through the (R)AN. For example, the wireless terminal may be a mobile terminal, for example, a mobile phone (or also referred to as a "cellular" phone), and a computer that has a mobile terminal. For example, the wireless terminal may be a portable, pocket-size, handheld, computer-integrated or vehicle-mounted mobile apparatus, which exchanges voice and/or data with the radio access network. The wireless terminal may also be referred to as a subscriber unit, a subscriber station, a mobile station, a mobile console, a remote station, an access point, a remote terminal, an access terminal, a user terminal, user equipment (UE), or a user agent. This is not limited herein.

Figure 2:
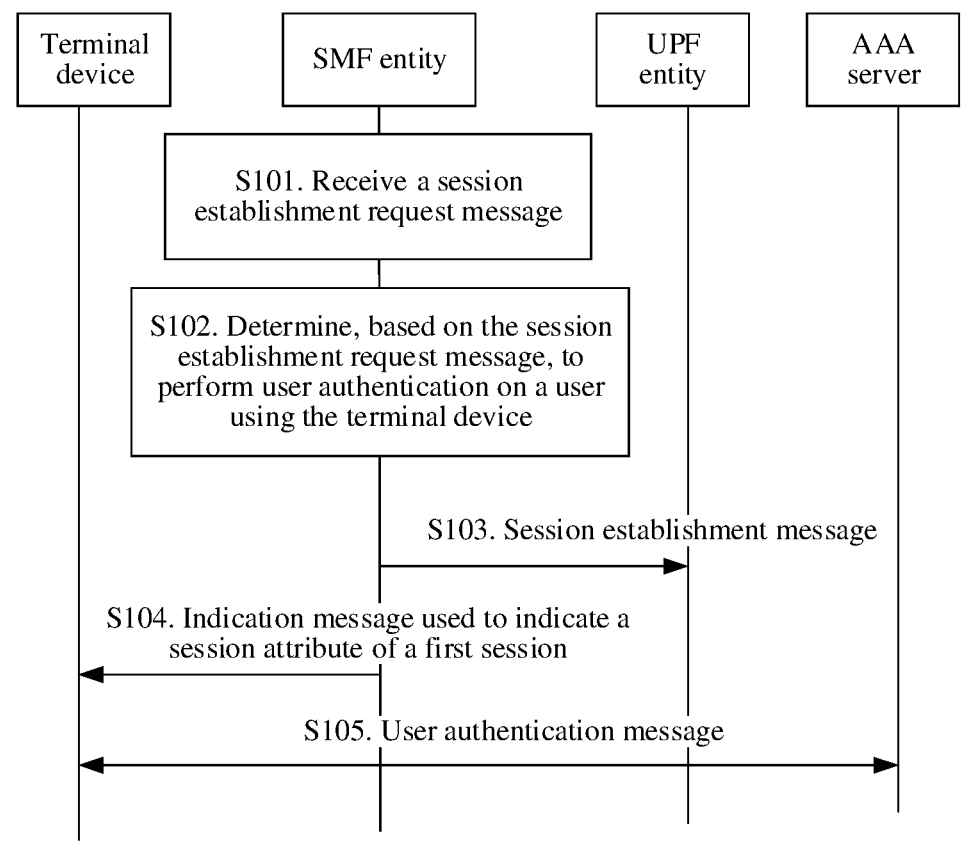
FIG. 2 is a signaling flowchart of a user authentication method according to Embodiment 1 of this application.

FIG. 2 is a signaling flowchart of a user authentication method according to Embodiment 1 of this application. With reference to FIG. 1 and FIG. 2, the method of this embodiment mainly includes the following steps.

Step S101: An SMF entity receives a session establishment request message, where the session establishment request is used to request to establish a session for a terminal device.

The method of this embodiment is applied before the terminal device establishes a session used to transmit service data. Before establishing the session, the terminal device first sends a registration request message to an AMF entity, and then performs bidirectional authentication with an AUSF/ARPF entity. After the bidirectional authentication is completed, the AMF entity sends an NAS security mode command (SMC) message to the terminal device, the terminal device sends an NAS security mode complete (SMP) message to the AMF entity, and after receiving the NAS SMP message, the AMF entity sends a registration accept message to the terminal device.

After completing registration, the terminal device sends the session establishment request message to the SMF entity, and usually the session establishment request message is forwarded by the AMF entity.

It needs to be clarified that, the session establishment request message may carry an identifier (ID) of the terminal device. The ID of the terminal device may be a subscriber permanent identifier (Subscriber Permanent ID) or a temporary user identifier (Temporary User ID). The ID of the terminal device may be used to indicate the terminal device for which the SMF entity establishes a session. If the session establishment request message does not carry the ID of the terminal device, the AMF entity may alternatively determine, through a bearer established for the terminal device in a registration process, the terminal device that sends the message.

Optionally, the session establishment request message further carries at least one of the following information: a user authentication request identifier, service information, subscription information, operator authentication indication information, and third-party authentication indication information.

The user authentication request identifier is used by the terminal device to request to perform user authentication. For example, when the identifier is set to 1, it indicates that the terminal device requests to perform user authentication on a user using the terminal device; or when the identifier is set to 0, it indicates that the terminal device does not request to perform user authentication on a user using the terminal device. For another example, when the session establishment request message carries the identifier, it indicates that the terminal device requests to perform user authentication on a user using the terminal device; or when the session establishment request message does not carry the identifier, it indicates that the terminal device does not request to perform user authentication on a user using the terminal device.

The operator authentication indication information is used by an operator to indicate whether to perform user authentication. For example, the operator may designate some users on which user authentication is to be performed, and the operator authentication indication information may be set by the operator. The third-party authentication indication information is used by a third-party service provider to indicate whether to perform user authentication. For example, the third-party service provider determines, based on a service provided by the third-party service provider, whether user authentication needs to be performed, and the third-party authentication indication information may be set by the third-party service provider.

The service information may be information about a service initiated or received by a user through the terminal device, and may specifically include one or more of the following information: a service type, an access point name (APN), a data network name, network slice selection assistance information (NSSAI), and the like.

The subscription information may be subscription information of a SIM card or a USIM card, for example, subscription information of a SIM card or a USIM of the terminal device, and belongs to the prior art, and details are not described again.

The SMF entity determines, based on the service information, whether to perform user authentication. For example, the SMF entity may select to perform user authentication on a service type, or the SMF entity selects to perform user authentication on a user accessing through an APN. When the SMF entity is an SMF entity of a network slice, a session type of the terminal device may be determined based on a type of the network slice, and therefore the session establishment request message may not need to carry the service information.

Step S102: The SMF entity determines, based on the session establishment request message, to perform user authentication on a user using the terminal device.

User authentication is used to verify authority of the user using the terminal device, and is different from authentication performed on authority of the terminal device or the SIM (or USIM) card. Specifically, the SMF entity may determine, based on one or more of the user authentication request identifier, the service information, the subscription information, the operator authentication indication information, and the third-party authentication indication information that are obtained from the session establishment request message, whether to perform user authentication on the user. In a manner, if the session establishment request message includes the user authentication request identifier, the SMF entity determines to perform user authentication on the user.

In another manner, when the SMF entity determines, based on a plurality of types of the foregoing information, whether to perform user authentication, provided that one piece of the information instructs to perform user authentication, the SMF entity determines to perform user authentication. For example, when the operator authentication indication information instructs to perform user authentication, but the third-party authentication indication information instructs not to perform user authentication, to ensure communication security, the SMF entity determines to perform user authentication on the user.

In still another manner, priorities are set for the foregoing pieces of information, and the SMF entity determines, based on content indicated by information having a highest priority, whether to perform user authentication on the user.

For example, the SMF entity determines, based on the service information, whether to perform user authentication on the terminal device. The SMF entity may determine a security requirement of the session based on the service information. If the session (for example, public security cluster communication or similar communication) has an extremely high security requirement, and it needs to ensure that the user is a legal holder of the terminal device, before establishing the session, the SMF entity needs to determine the identity of the user using the terminal device. If the session has a security requirement that is not high, user authentication may be not performed.

It should be noted that, even if the session establishment request message does not include any one of the user authentication request identifier, the service information, the subscription information, the operator authentication indication information, and the third-party authentication indication information, the SMF entity may determine, in another manner, whether to perform user authentication. For example, the SMF entity obtains the subscription information from the PCF entity, the HSS, the AUSF entity, or the ARPF entity, and determines, based on the subscription information, whether to perform user authentication, and the user may activate or purchase a service based on a requirement. For example, if an operator provides a user authentication service, the user may activate the user authentication service based on a requirement. After the user activates the user authentication service, related information of the user authentication service is stored in the subscription information, and the SMF entity may learn, from the subscription information, that the user activates the user authentication service, and therefore determines to perform user authentication. Alternatively, the SMF entity determines a session type based on a network slice type to which the SMF entity belongs, and predefines session types on which user authentication needs to be performed, and session types on which user authentication does not need to be performed, and the SMF entity determines, based on the determined session type, whether to perform user authentication.

If the SMF entity determines to perform user authentication, step S103 is performed; or if the SMF entity determines not to perform user authentication, the session used to transmit the service data is established based on an existing session establishment process.

Step S103: The SMF entity sends a session establishment message to a UPF entity, where the session establishment message is used to establish a first session for the terminal device, and a session attribute of the first session is: a session used to transmit only a user authentication message.

An existing session establishment message may be used as the session establishment message, or a newly defined message may be used as the session establishment message, the newly defined message is different from the existing session establishment message, and the terminal device may learn, based on the newly defined message, that the newly defined message is used to establish the first session.

Moreover, the session establishment message may carry a session attribute identifier of the first session, and the session attribute identifier is used to indicate that the session attribute of the first session is: a session used to transmit only a user authentication message.

Optionally, after receiving the session establishment message, the UPF entity may bind a session ID and the session attribute identifier, and subsequently, may determine the session attribute identifier based on the session ID and similarly, may determine the session ID based on the session attribute identifier.

It needs to be clarified that, in this embodiment and the following embodiments, a session used to transmit only a user authentication message is referred to as the first session, the session used to transmit the service data is referred to as a second session, and the first session and the second session may be similar sessions differentiated only in different functions, or may be different sessions. This is not limited. Certainly, other names may alternatively be used to differentiate the two sessions.

Step S104: The SMF entity sends an indication message to the terminal device, where the indication message is used to indicate the session attribute of the first session.

The indication message may be an existing session establishment complete message, and the session attribute of the first session is explicitly indicated by adding the session attribute identifier of the first session to the session establishment complete message. A newly defined message may be further used as the indication message, the newly defined message does not need to carry the session attribute identifier of the first session, and the newly defined message may implicitly indicate the session attribute of the first session.

Correspondingly, the terminal device receives the indication message from the SMF entity.

Step S105: The terminal device sends or receives the user authentication message through the first session.

After establishment of the first session is completed, the terminal device may send the user authentication message to the AAA server through the first session, or receive the user authentication message sent by the AAA server, and the user authentication message transmitted between the terminal device and the AAA server may be forwarded by the UPF entity.

It should be noted that, one or more user authentication messages may be transmitted between the terminal device and the AAA server, and the foregoing user authentication message may be one message in the user authentication process, or may be a collective name of all messages transmitted in the user authentication process.

The user authentication message may be included in a data packet. Optionally, the data packet includes a message type identifier, and the message type identifier is used to indicate that the data packet includes the user authentication message. The UPF entity may identify the data packet based on the message type identifier and forward the data packet.

For example, in a downlink transmission process, the UPF entity receives a data packet from the AAA server, where the data packet includes a message type identifier. If the UPF entity determines, based on the message type identifier, that the data packet includes a user authentication message, the UPF entity sends the user authentication message included in the data packet through the first session.

Optionally, the UPF entity may alternatively parse an IP address of a data packet that is in the first session and that needs to be forwarded. If the IP address of the data packet is not the AAA server, the UPF entity discards the data packet; or if the IP address of the data packet is the AAA server, the UPF entity forwards the data packet to the AAA server.

Optionally, if the UPF entity binds the session ID and the session attribute identifier when the first session is established, and the UPF entity receives a data packet on the first session, the UPF entity may learn the session ID of the data packet, and the UPF entity may determine the session attribute identifier of the first session based on the binding relationship and the session ID, and then forward the data packet based on the session attribute identifier of the first session. If the session attribute identifier of the first session indicates that the session attribute of the first session is: a session used to transmit only a user authentication message, the UPF entity forwards the data packet to the AAA server.

In this embodiment, the user authentication method is not limited, processes of different user authentication methods may be different, and authentication data carried in user authentication messages may also be different. For example, the terminal device sends a user authentication request to the AAA server, where the user authentication request is transmitted through the first session. After receiving the user authentication request, the AAA server adds to-be-signed data to an authentication message and sends the authentication message to the terminal device, where verification data of the AAA server also needs to be added to the authentication message, the verification data of the AAA server may be a hash value generated by the AAA server based on registration information of the terminal device, and the verification data of the AAA server is used by the terminal device to verify authority of the AAA server. After receiving the authentication message sent by the AAA server, the terminal device first determines authority of the authentication message, for example, determines whether the hash value carried in the authentication message is consistent with a hash value of the terminal device during registration. If the hash value carried in the authentication message is consistent with the hash value of the terminal device during registration, the terminal device determines that the authentication message is authorized and valid. After the terminal device determines that the authentication message is authorized, the user of the terminal device provides biological information to the AAA server for verification, where the biological information may be information about the user such as a fingerprint, a sound, or an iris. After the foregoing verification succeeds, the terminal device processes the to-be-signed data, for example, signs the to-be-signed data by using a private key of the terminal device, and then returns signed data to the AAA server, thereby completing user authentication.

Additionally, the user authentication message transmitted in the user authentication process may be transmitted through a user plane. For transmission through the user plane, a secure transmission channel needs to be established to ensure security of transmitted data, and the secure transmission channel may be based on internet protocol security (IPSec). Therefore, even if the UPF entity forwards the user authentication message, the UPF entity cannot obtain specific content of the data packet through parsing. Certainly, the terminal device and the AAA server may alternatively encrypt authentication data by using a key that is agreed on by the both parties during registration of the terminal device, to prevent leakage of the authentication data due to damage to the secure transmission channel.

Optionally, the foregoing method further includes: obtaining, by the SMF entity, a result of the user authentication; and when the result of the user authentication indicates that the user authentication succeeds, deleting, by the SMF entity, the first session, and establishing a second session for the terminal device, where a session attribute of the second session is: a session used to transmit service data.

Further, the terminal device may transmit the service data through the second session, and does not need to perform user authentication again in a process of transmitting the service data.

Optionally, the foregoing method further includes: obtaining, by the SMF entity, a result of the user authentication; and when the result of the user authentication indicates that the user authentication succeeds, changing, by the SMF entity, the session attribute of the first session into: a session used to transmit service data.

Further, the terminal device may transmit the service data through the changed first session.

In this embodiment, before establishing, for the terminal device, the session used to transmit the service data, the SMF entity receives the session establishment request message; determines, based on the session establishment request message, to perform user authentication on the user using the terminal device; and sends the session establishment message to the UPF entity, where the session establishment message is used to establish the first session for the terminal device, and the session attribute of the first session is: a session used to transmit only a user authentication message. Subsequently, the terminal device and the AAA server transmit the user authentication message through the first session, to complete user authentication. This prevents an unauthorized user from performing communication by using the terminal device, thereby strengthening security management of an operator on communication that is performed by a user by using the terminal device.

Figure 3:
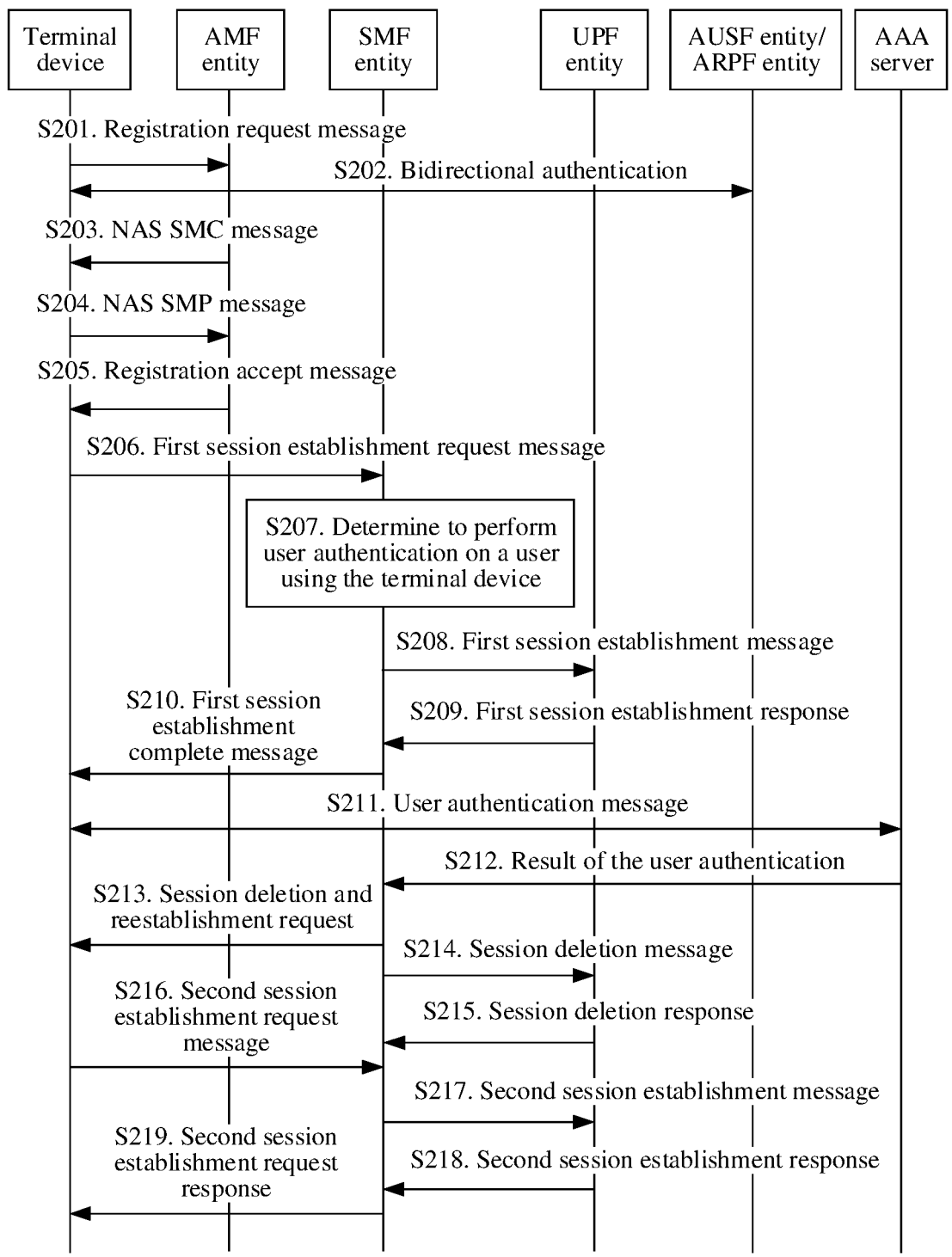
FIG. 3 is a signaling flowchart of a user authentication method according to Embodiment 2 of this application.

Based on Embodiment 1, FIG. 3 is a signaling flowchart of a user authentication method according to Embodiment 2 of this application. As shown in FIG. 3, the method of this embodiment includes the following steps.

Step S201: A terminal device sends a registration request message to an AMF entity.

Step S202: The terminal device performs bidirectional authentication with an AUSF/ARPF entity.

Step S203: The AMF entity sends an NAS SMC message to the terminal device.

Step S204: The terminal device sends an NAS SMP message to the AMF entity.

Step S205: The AMF entity sends a registration accept message to the terminal device.

Steps S201 to S205 belong to the prior art, and details are not described herein again.

It should be noted that, S201 to S205 and steps following S206 represent only a relative location relationship between bidirectional authentication (that is, subscription information authentication) and user authentication. To be specific, the bidirectional authentication occurs before the user authentication. There may be another message between S205 and S206. This is not limited herein.

Step S206: The terminal device sends a first session establishment request message to an SMF entity, where the first session establishment request message is used to request to establish a session for the terminal device.

Optionally, the first session establishment request message includes at least one of the following information: a user authentication request identifier, service information, subscription information, operator authentication indication information, and third-party authentication indication information.

Step S207: The SMF entity determines, based on the first session establishment request message, to perform user authentication on a user using the terminal device.

Step S208: The SMF entity sends a first session establishment message to a UPF entity, where the first session establishment message is used to establish a first session for the terminal device.

A session attribute of the first session is: a session used to transmit only a user authentication message. The first session establishment message includes an identifier of the terminal device and/or a session ID, used to identify that the first session is a session of the terminal device.

Optionally, the first session establishment message includes a session attribute identifier of the first session, and the session attribute identifier is used to indicate that the session attribute of the first session is: a session used to transmit only a user authentication message.

Step S209: The UPF entity sends a first session establishment response to the SMF entity.

Step S210: The SMF entity sends a first session establishment complete message to the terminal device.

The first session establishment complete message may be used to indicate, to the terminal device, completed establishment of the first session and the session attribute of the first session.

Optionally, the first session establishment complete message includes the session attribute identifier of the first session.

Step S211: The terminal device and an AAA server transmit the user authentication message through the first session, and perform user authentication.

The user authentication message may be forwarded by the UPF entity.

For specific implementations of step S206 and step S211, refer to related descriptions in Embodiment 1. Details are not described herein again.

Step S212: The AAA server sends a result of user authentication to the SMF entity.

The AAA server may send the result of the user authentication to the SMF entity through the first session, and when the result of the user authentication is sent through the first session, a message carrying the result of the user authentication may be forwarded by the UPF entity. Each user authentication message is encrypted in a user authentication process, and therefore the UPF entity cannot parse the user authentication message to obtain content carried in the user authentication message. In this step, the SMF entity needs to accept or reject a session establishment request of the terminal device based on the result of the user authentication, and the SMF entity needs to obtain the result of the user authentication. Therefore, the message carrying the result of the user authentication needs to be unencrypted or be identifiable to the SMF entity. When the message carrying the result of the user authentication is encrypted, an authentication success indication may be carried at a header location of the data packet, and the SMF entity determines, based on the authentication success indication, that the user authentication succeeds. Optionally, the result of the user authentication may alternatively be notified by the AAA server or the UPF entity to the SMF entity through a signaling message.

Step S213: When the result of the user authentication indicates that the user authentication succeeds, the SMF entity sends a session deletion and reestablishment request to the terminal device.

The session deletion and reestablishment request is used to instruct the terminal device to delete the first session and establish a second session. Optionally, the session deletion and reestablishment request may carry an identifier of the first session, and the identifier of the first session is used to instruct the terminal device to delete the first session and establish the second session. When the result of the user authentication indicates that the user authentication fails, the SMF entity sends a session establishment failure message to the terminal device, to reject the terminal device in session establishment. The message plays a role of deleting a current session and reestablishing a new session, and may be the foregoing session deletion and reestablishment request message or may be another message playing a similar role. This is not limited herein.

Step S214: The SMF entity sends a session deletion message to the UPF entity.

The session deletion message is used to instruct the UPF entity to delete the first session, and the session deletion message carries the ID of the terminal device and/or the session ID. Therefore, the UPF entity may learn, based on the ID of the terminal device and/or the session ID, that a to-be-deleted session is the first session.

Step S215: The UPF entity sends a session deletion response to the SMF entity.

Step S216: The terminal device sends a second session establishment request message to the SMF entity, where the second session establishment request message is used to request to establish the second session.

After receiving the session deletion and reestablishment request, the terminal device deletes the first session based on the session deletion and reestablishment request, and sends the second session establishment request message to the SMF entity.

Step S217: The SMF entity sends a second session establishment message to the UPF entity, where the second session establishment message is used to establish the second session.

If the SMF entity learns, after receiving the second session establishment request message, that the terminal device requests to establish the second session, the SMF entity sends the second session establishment message to the UPF entity.

Step S218: The UPF entity sends a second session establishment response to the SMF entity.

Step S219: The SMF entity sends a second session establishment request response to the terminal device.

The second session establishment request response is used to notify the terminal device that establishment of the second session is completed.

In this embodiment, through steps S213 to S219, the first session is deleted and the second session is established for the terminal device. It should be noted that, a process of establishing the second session is not limited to the foregoing process, the SMF entity may alternatively not perform steps S213 and S217, but directly instruct the UPF entity to delete the first session, and establish the second session for the terminal device after the first session is deleted; and instruct, after establishment of the second session is completed, the terminal device to delete the first session, and notify the terminal device that the second session has been established. Herein, an order of performing S213 and S214 is not limited either. S213 may be first performed and then S214 is performed, or S214 may be first performed and then S213 is performed. Similarly, an order of performing S216 and S214 is not limited either.

Figure 4:
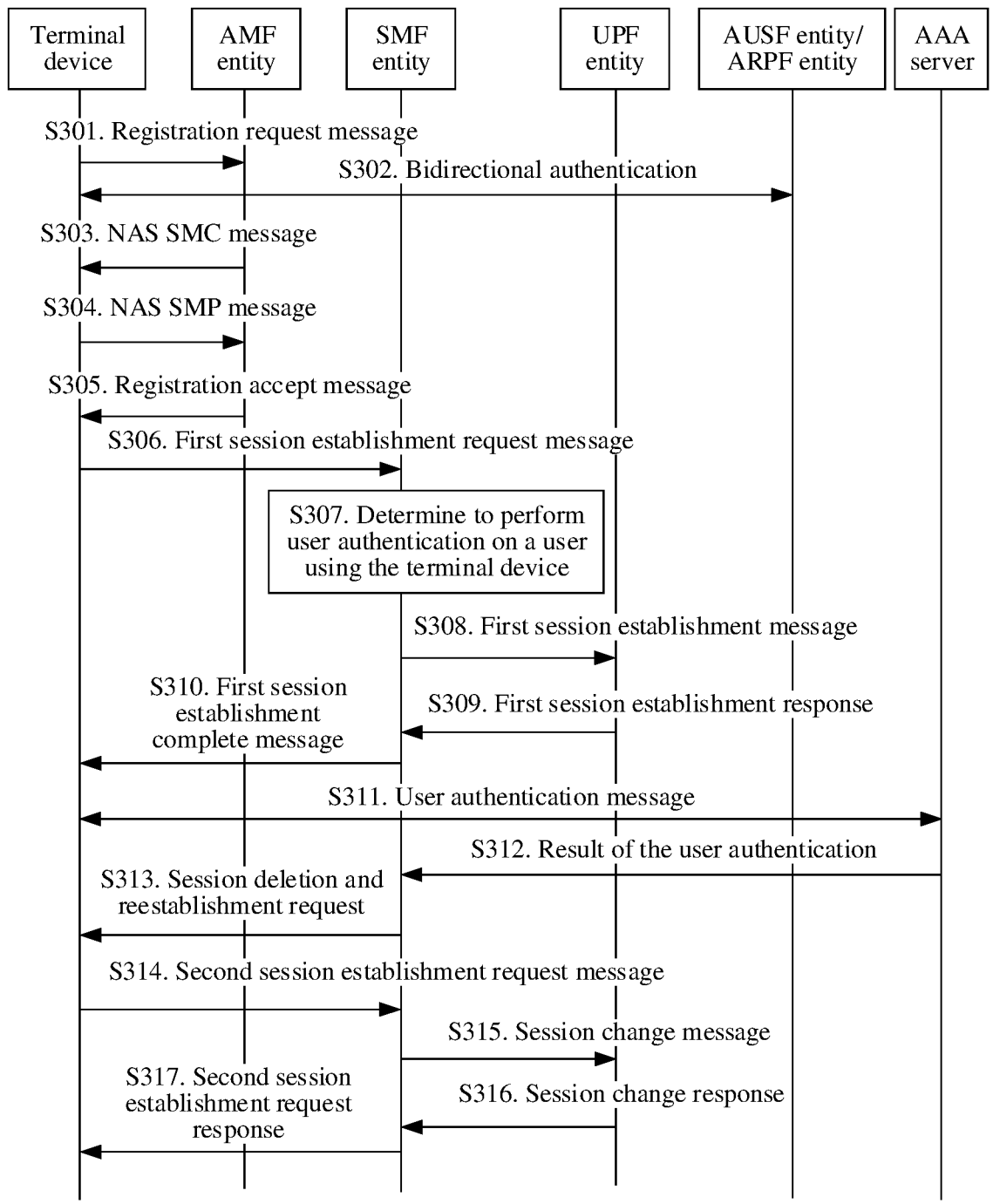
FIG. 4 is a signaling flowchart of a user authentication method according to Embodiment 3 of this application.

Based on Embodiment 1, FIG. 4 is a signaling flowchart of a user authentication method according to Embodiment 3 of this application. As shown in FIG. 4, the method of this embodiment includes the following steps.

Step S301: A terminal device sends a registration request message to an AMF entity.

Step S302: The terminal device performs bidirectional authentication with an AUSF/ARPF entity.

Step S303: The AMF entity sends an NAS SMC message to the terminal device.

Step S304: The terminal device sends an NAS SMP message to the AMF entity.

Step S305: The AMF entity sends a registration accept message to the terminal device.

Step S306: The terminal device sends a first session establishment request message to an SMF entity, where the first session establishment request message is used to request to establish a session for the terminal device.

Optionally, the first session establishment request message includes at least one of the following information: a user authentication request identifier, service information, subscription information, operator authentication indication information, and third-party authentication indication information.

Step S307: The SMF entity determines, based on the first session establishment request message, to perform user authentication on a user using the terminal device.

Step S308: The SMF entity sends a first session establishment message to a UPF entity, where the first session establishment message is used to establish a first session for the terminal device.

A session attribute of the first session is: a session used to transmit only a user authentication message.

Step S309: The UPF entity sends a first session establishment response to the SMF entity.

Step S310: The SMF entity sends a first session establishment complete message to the terminal device.

Step S311: The terminal device and an AAA server transmit the user authentication message through the first session, and perform user authentication.

Step S312: The AAA server sends a result of user authentication to the SMF entity.

Step S313: When the result of the user authentication indicates that the user authentication succeeds, the SMF entity sends a session deletion and reestablishment request to the terminal device.

Implementations of steps S301 to S313 are the same as those of steps S201 to S213 in Embodiment 2. Details are not described herein again.

Step S314: The terminal device sends a second session establishment request message to the SMF entity, where the second session establishment request message is used to request to establish the second session.

Step S315: The SMF entity sends a session change message to the UPF entity.

The session change message is used to change the attribute of the first session. Optionally, the session change message includes at least one of the following identifiers: an ID of the terminal device, a session ID, and a target session attribute identifier. The target session attribute identifier is used to indicate that the first session is a session used to transmit service data, a session attribute before the change indicates that the first session is a session used to transmit only a user authentication message, and a session attribute after the change indicates that the first session is a session used to transmit service data. The UPF entity changes the session attribute based on one or more of the ID of the terminal device, the session ID, and the target session attribute identifier. When the session change message does not include the target session attribute identifier, the UPF entity changes, after receiving the session change message, the session attribute of the first session by default into: a session used to transmit service data.

Step S316: The UPF entity sends a session change response to the SMF entity.

Step S317: The SMF entity sends a second session establishment request response to the terminal device.

The second session establishment request response is used to notify the terminal device that session establishment is completed.

In Embodiment 2 and Embodiment 3, the AAA server sends the result of the user authentication to the SMF entity, and the SMF entity can learn, based on the result of the user authentication, whether the authentication succeeds. To be specific, the result of the user authentication is visible to the SMF entity.

In another possible implementation, the AAA server may send the result of the user authentication to the terminal device, and the result of the user authentication is invisible to the UPF entity and the SMF entity. After receiving the result of the user authentication, the terminal device may send a user authentication complete message to the SMF entity, where the user authentication complete message includes the result of the user authentication, and the SMF entity verifies that the result of the user authentication is valid. For example, the SMF entity sends an authentication result obtaining request to the AAA server, where the authentication result obtaining request is used to request a result of the user authentication of the terminal device, and the authentication result obtaining request includes the ID of the terminal device; the AAA server sends the result of the user authentication corresponding to the ID of the terminal device to the SMF entity based on the ID of the terminal device; and the SMF entity compares whether the result of the user authentication sent by the terminal device is the same as a result of the user authentication sent by the AAA server, and determines, when the result of the user authentication sent by the terminal device is the same as the result of the user authentication sent by the AAA server, that the result of the user authentication is valid. After determining that the result of the user authentication is valid, the SMF entity may delete the first session and establish the second session, or change the attribute of the first session based on the method in the foregoing embodiment.

Figure 5:
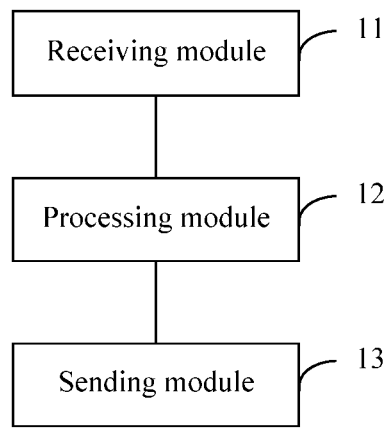
FIG. 5 is a schematic structural diagram of an SMF entity according to Embodiment 4.

FIG. 5 is a schematic structural diagram of an SMF entity according to Embodiment 4. As shown in FIG. 5, the SMF entity includes: a receiving module 11, configured to receive a session establishment request message, where the session establishment request is used to request to establish a session for a terminal device; a processing module 12, configured to determine, based on the session establishment request message, to perform user authentication on a user using the terminal device; and a sending module 13, configured to send a session establishment message to a user plane function entity, where the session establishment message is used to establish a first session for the terminal device, and a session attribute of the first session is: a session used to transmit only a user authentication message, where the sending module 13 is further configured to send an indication message to the terminal device, where the indication message is used to indicate the session attribute of the first session.

Optionally, the receiving module 11 is further configured to obtain a result of the user authentication; and correspondingly, the processing module 12 is further configured to: when the result of the user authentication indicates that the user authentication succeeds, delete the first session, and establish a second session for the terminal device, where a session attribute of the second session is: a session used to transmit service data; or when the result of the user authentication indicates that the user authentication succeeds, change the session attribute of the first session into: a session used to transmit service data.

Optionally, the receiving module 11 is specifically configured to: receive the result of the user authentication sent by an authentication, authorization and accounting AAA server; or receive the result of the user authentication sent by the terminal device.

When the result of the user authentication is sent by the terminal device, the processing module 12 is further configured to: verify that the result of the user authentication is valid.

The SMF entity of this embodiment may be configured to perform steps performed by the SMF entity in Embodiment 1 to Embodiment 3, and specific implementations and technical effects of this embodiment are similar to those of Embodiment 1 to Embodiment 3. Details are not described herein again.

Figure 6:
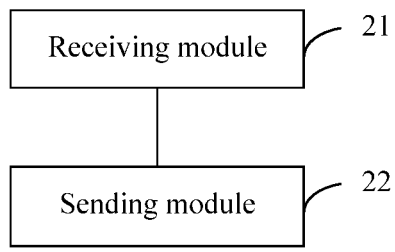
FIG. 6 is a schematic structural diagram of a terminal device according to Embodiment 5.

FIG. 6 is a schematic structural diagram of a terminal device according to Embodiment 5. As shown in FIG. 6, the terminal device includes: a receiving module 21, configured to receive an indication message from a session management function entity, where the indication message is used to indicate that a session attribute of a first session is: a session used to transmit only a user authentication message; and a sending module 22, configured to send the user authentication message through the first session, where the receiving module 21 is further configured to receive the user authentication message through the first session.

Optionally, the user authentication message is included in a data packet, the data packet includes a message type identifier, and the message type identifier is used to indicate that the data packet includes the user authentication message.

The terminal device of this embodiment may be configured to perform steps performed by the terminal device in Embodiment 1 to Embodiment 3, and specific implementations and technical effects of this embodiment are similar to those of Embodiment 1 to Embodiment 3. Details are not described herein again.

Figure 7:
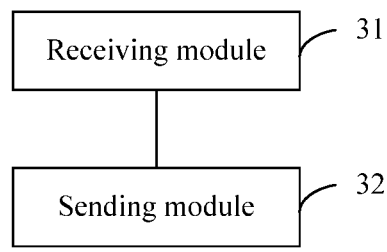
FIG. 7 is a schematic structural diagram of a UPF entity according to Embodiment 6.

FIG. 7 is a schematic structural diagram of a UPF entity according to Embodiment 6. As shown in FIG. 7, the UPF entity includes: a receiving module 31, configured to receive a session establishment message from a session management function entity, where the session establishment message is used to establish a first session for a terminal device, and a session attribute of the first session is: a session used to transmit only a user authentication message; and a sending module 32, configured to send the user authentication message of the terminal device through the first session, where the receiving module 31 is further configured to receive the user authentication message of the terminal device through the first session.

Optionally, the user authentication message is included in a data packet, the data packet includes a message type identifier, and the message type identifier is used to indicate that the data packet includes the user authentication message.

Correspondingly, the receiving module 31 is specifically configured to: receive the data packet of the terminal device from an authentication, authorization and accounting AAA server; and the sending module 32 is specifically configured to, if the data packet includes the user authentication message of the terminal device, send, by the user plane function entity through the first session, the user authentication message included in the data packet.

The UPF entity of this embodiment may be configured to perform steps performed by the UPF entity in Embodiment 1 to Embodiment 3, and specific implementations and technical effects of this embodiment are similar to those of Embodiment 1 to Embodiment 3. Details are not described herein again.

Figure 8:
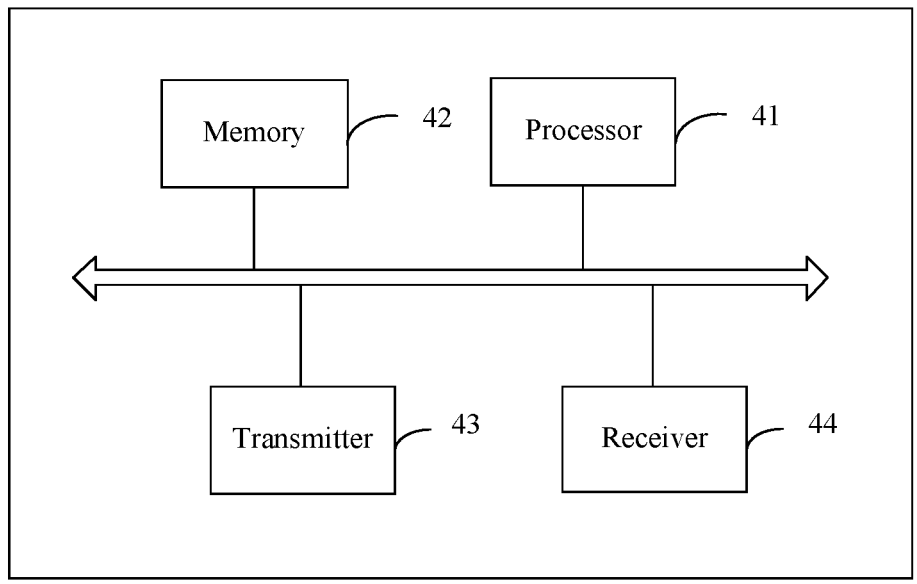
FIG. 8 is a schematic structural diagram of an SMF entity according to Embodiment 7.

FIG. 8 is a schematic structural diagram of an SMF entity according to Embodiment 7. As shown in FIG. 8, the SMF entity includes: a processor 41, a memory 42, a transmitter 43, and a receiver 44. The memory 42, the transmitter 43, and the receiver 44 are connected to and communicate with the processor 41 through a system bus, the memory 42 is configured to store a computer program, the transmitter 43 is configured to send data to another device, the receiver 44 is configured to receive the data sent by the another device, and the processor 41 is configured to run the program stored in the memory 42, the SMF entity is enabled to perform steps performed by the SMF entity in Embodiment 1 to Embodiment 3, and specific implementations and technical effects of this embodiment are similar to those of Embodiment 1 to Embodiment 3. Details are not described herein again.

Figure 9:
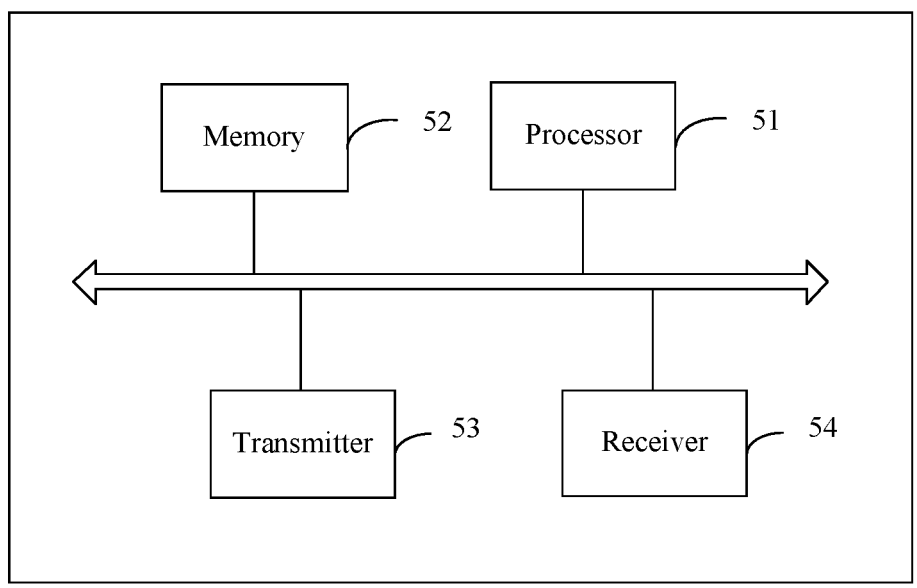
FIG. 9 is a schematic structural diagram of a terminal device according to Embodiment 8.

FIG. 9 is a schematic structural diagram of a terminal device according to Embodiment 8. As shown in FIG. 9, the terminal device includes: a processor 51, a memory 52, a transmitter 53, and a receiver 54. The memory 52, the transmitter 53, and the receiver 54 are connected to and communicate with the processor 51 through a system bus, the memory 52 is configured to store a computer program, the transmitter 53 is configured to send data to another device, the receiver 54 is configured to receive the data sent by the another device, and the processor 51 is configured to run the program stored in the memory 52, the terminal device is enabled to perform steps performed by the terminal device in Embodiment 1 to Embodiment 3, and specific implementations and technical effects of this embodiment are similar to those of Embodiment 1 to Embodiment 3. Details are not described herein again.

Figure 10:
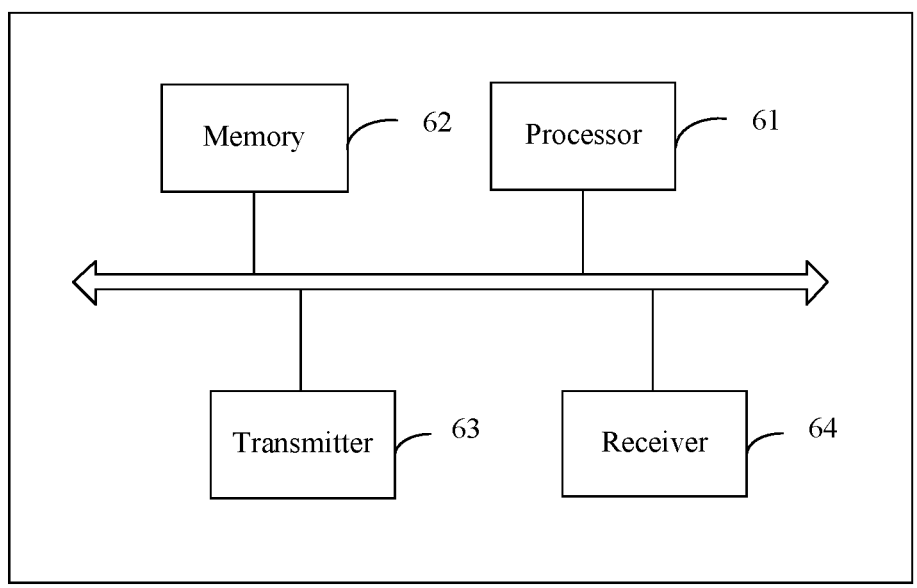
FIG. 10 is a schematic structural diagram of a UPF entity according to Embodiment 9.

FIG. 10 is a schematic structural diagram of a UPF entity according to Embodiment 9. As shown in FIG. 10, the UPF entity includes: a processor 61, a memory 62, a transmitter 63, and a receiver 64. The memory 62, the transmitter 63, and the receiver 64 are connected to and communicate with the processor 61 through a system bus, the memory 62 is configured to store a computer program, the transmitter 63 is configured to send data to another device, the receiver 64 is configured to receive the data sent by the another device, and the processor 61 is configured to run the program stored in the memory 62, the UPF entity is enabled to perform steps performed by the UPF entity in Embodiment 1 to Embodiment 3, and specific implementations and technical effects of this embodiment are similar to those of Embodiment 1 to Embodiment 3. Details are not described herein again.

It may be understood that the processor mentioned in this application may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The bus in this application may be an industry standard architecture (ISA) bus, a peripheral component interconnect (PCI) bus, an extended industry standard architecture (EISA) bus, or the like. The bus may be classified into an address bus, a data bus, a control bus, and the like. For convenience of representation, the bus in the accompanying drawings of this application is not limited to only one bus or one type of bus.

The communications interface mentioned in this application may include an independent transmitter and an independent receiver, or a transmitter and a receiver may be integrated. The communications interface may operate under an indication of a corresponding processor. Optionally, the transmitter may correspond to a transmitter in a physical device, and the receiver may correspond to a receiver in the physical device.

In addition, it should be noted and understood that modules division of the foregoing network slice management apparatus is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in this application may be integrated into one processing unit, or each of the units may exist alone physically, or two or more units are integrated into one unit. The integrated unit may be implemented in a form of hardware, or may be implemented in a form of hardware in addition to a software functional unit.

What is claimed is:

1. A method, comprising:
receiving, by a session management function entity, a session establishment request message, after a terminal device is registered on a communication network according to a request to register sent by the terminal device, the communication network including the session management function entity, wherein the session establishment request message requests to establish a session for the terminal device on the communication network, and wherein the session management function entity is located in a core network of a service provider;
determining, by the session management function entity based on the session establishment request message, to perform user authentication on a user of the terminal device before establishing the session for the terminal device on the communication network, wherein the user authentication verifies authority of a specific user using the terminal device;
sending, by the session management function entity, a session establishment message to a user plane function entity, wherein the session establishment message is used to establish a first session for the terminal device, and a session attribute of the first session is that the first session is used to transmit only a user authentication message;
sending, by the session management function entity, an indication message to the terminal device, wherein the indication message indicates the session attribute of the first session;
obtaining, by the session management function entity, a result of the user authentication; and
changing, in response to the result of the user authentication indicating that the user authentication has succeeded, by the session management function entity, the session attribute of the first session to indicate that the first session is used to transmit service data;
wherein the session establishment message comprises a session attribute identifier of the first session, and the session attribute identifier indicates the session attribute of the first session.

2. The method according to claim 1, wherein the session establishment request message comprises:
a user authentication request identifier, service information, subscription information, operator authentication indication information, or third-party authentication indication information.

3. The method according to claim 1, further comprising:
obtaining, by the session management function entity, a result of the user authentication; and
in response to the result of the user authentication indicating that the user authentication has succeeded, deleting, by the session management function entity, the first session, and establishing a second session for the terminal device, wherein a session attribute of the second session is that the second session is used to transmit service data.

4. The method according to claim 3, wherein obtaining, by the session management function entity, the result of the user authentication comprises:
receiving, by the session management function entity, the result of the user authentication sent by an authentication, authorization and accounting (AAA) server.

5. The method according to claim 3, wherein obtaining, by the session management function entity, the result of the user authentication comprises:
receiving, by the session management function entity, the result of the user authentication sent by the terminal device; and
after obtaining, by the session management function entity, the result of the user authentication, the method further comprises:
verifying, by the session management function entity, that the result of the user authentication is valid.

6. A session management device, comprising:
a receiver;
a transmitter;
a processor; and a non-transitory computer-readable storage medium storing a program to be executed by the processor, the program including instructions to:
receive, using the receiver, a session establishment request message, after a terminal device is registered on a communication network according to a request to register sent by the terminal device, the communication network including the session management device, wherein the session establishment request message requests to establish a session for the terminal device on the communication network, wherein the session management device is located in a core network of a service provider;
determine, based on the session establishment request message, to perform user authentication on a user of the terminal device before establishing the session for the terminal device on the communication network, wherein the user authentication verifies authority of a specific user using the terminal device;
send, using the transmitter, a session establishment message to a user plane function entity, wherein the session establishment message is used to establish a first session for the terminal device, and a session attribute of the first session is that the first session is used to transmit only a user authentication message;
send, using the transmitter, an indication message to the terminal device, wherein the indication message indicates the session attribute of the first session;
obtain, using the transmitter, a result of the user authentication; and
change, in response to the result of the user authentication indicating that the user authentication has succeeded, the session attribute of the first session to indicate that the first session is used to transmit service data;
wherein the session establishment message comprises a session attribute identifier of the first session, and the session attribute identifier indicates the session attribute of the first session.

7. The device according to claim 6, wherein the session establishment request message comprises:
a user authentication request identifier, service information, subscription information, operator authentication indication information, and third-party authentication indication information.

8. The device according to claim 6, wherein the program further includes instructions to:
obtain, through the receiver, a result of the user authentication; and
in response to the result of the user authentication indicating that the user authentication has succeeded, delete the first session, and establish a second session for the terminal device, wherein a session attribute of the second session is that the second session is used to transmit service data.

9. The device according to claim 8, wherein the program further includes instructions to receive, through the receiver, the result of the user authentication sent by an authentication, authorization and accounting (AAA) server.

10. The device according to claim 8, wherein the program further includes instructions:
to receive, through the receiver, the result of the user authentication sent by the terminal device; and
verify that the result of the user authentication is valid.

11. A terminal device, comprising:
a receiver;
a transmitter;
a processor; and
a non-transitory computer-readable storage medium storing a program to be executed by the processor, the program including instructions to:
send, using the transmitter, a session establishment request message, to a session management function entity, after the terminal device is registered on a communication network according to a request to register sent by the terminal device, the communication network including the session management function entity, wherein the session establishment request message requests to establish a session for the terminal device on the communication network, and wherein the session management function entity is located in a core network of a service provider;
receive, through the receiver, an indication message from a session management function entity, wherein the indication message indicates that a session attribute of a first session is that the first session is used to transmit only a user authentication message, wherein the user authentication message is used to perform user authentication, and wherein the user authentication verifies authority of a specific user using the terminal device;
send, using the transmitter, the user authentication message through the first session, wherein the first session is used to communicate only the user authentication message, or receive, through the receiver, the user authentication message through the first session;
receive, from the session management function entity, in response to a result of the user authentication indicating that the user authentication has succeeded, a changed session attribute of the first session to indicate that the first session is used to transmit service data;
wherein the session establishment request message comprises a session attribute identifier of the first session, and the session attribute identifier indicates the session attribute of the first session.

12. The terminal device according to claim 11, wherein the user authentication message is comprised in a data packet, the data packet comprises a message type identifier, and the message type identifier indicates that the data packet comprises the user authentication message.

13. The terminal device according to claim 11, wherein the user authentication message is sent through the first session to an authentication, authorization and accounting (AAA) server.

14. The terminal device according to claim 11, wherein the user authentication message is received through the first session from an authentication, authorization and accounting (AAA) server.

* * * * *